United States Patent [19]

Dietlein

[11] 3,884,006

[45] May 20, 1975

[54] SANDWICH PANEL INSERT

[76] Inventor: Robert W. Dietlein, 2904 Harmony Pl., La Crescenta, Calif. 91214

[22] Filed: May 24, 1974

[21] Appl. No.: 473,284

Related U.S. Application Data

[63] Continuation of Ser. No. 321,245, Jan. 5, 1973, abandoned.

[52] U.S. Cl. ............... 52/617; 151/41.7; 151/41.73
[51] Int. Cl. ......................... B23p 3/00; F16b 39/00
[58] Field of Search ............. 52/617, 707; 151/41.7, 151/41.73; 29/455, 460

[56] References Cited
UNITED STATES PATENTS

| | | | |
|---|---|---|---|
| 3,285,311 | 11/1966 | Cushman | 52/617 |
| 3,339,609 | 9/1967 | Cushman | 52/617 |
| 3,564,798 | 2/1971 | Darby et al. | 151/41.7 |
| 3,621,557 | 11/1971 | Cushman et al. | 151/41.7 |
| 3,662,805 | 5/1972 | Sygnator | 52/617 |

Primary Examiner—Frank L. Abbott
Assistant Examiner—James L. Ridgill, Jr.
Attorney, Agent, or Firm—William W. Haefliger

[57] ABSTRACT

An insert is receivable into a sandwich panel assembly via a through opening in one panel, the insert comprises:
a. a shank and a pair of spaced heads integral therewith, one head being generally circularly sized for close reception in the one panel opening when the other head and shank are inserted into the space between the panels,
b. the one head being apertured to pass hardenable material into the panel sandwich assembly and into the space between the heads to permanently retain the insert to the panel assembly, and
c. a radially inwardly yieldable retainer retained on the insert adjacent and at the side of the one head which faces the other head, the retainer located to be deflected radially inwardly when inserted through the one panel via said opening and to expand radially outwardly immediately adjacent the inner side of said one panel to temporarily retain the insert against dislodgement from the panel assembly prior to hardening of the material in said assembly.

6 Claims, 5 Drawing Figures

PATENTED MAY 20 1975  3,884,006
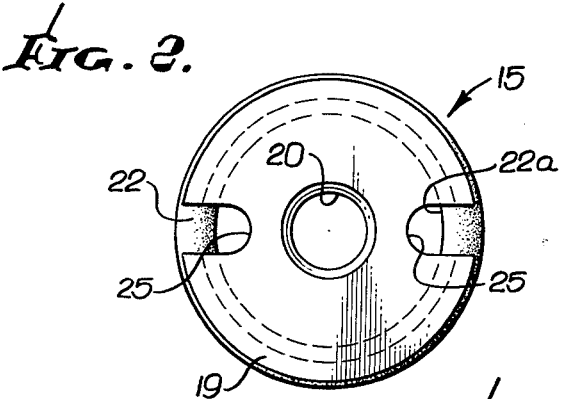
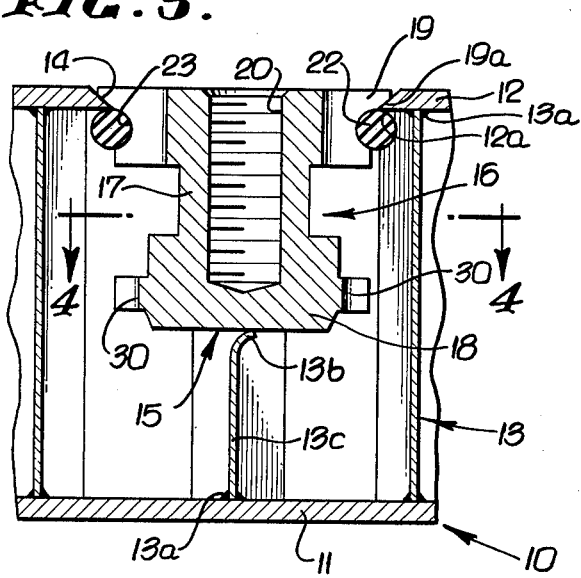
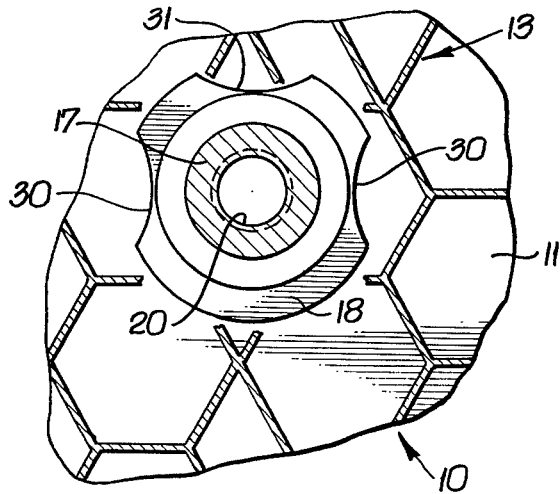
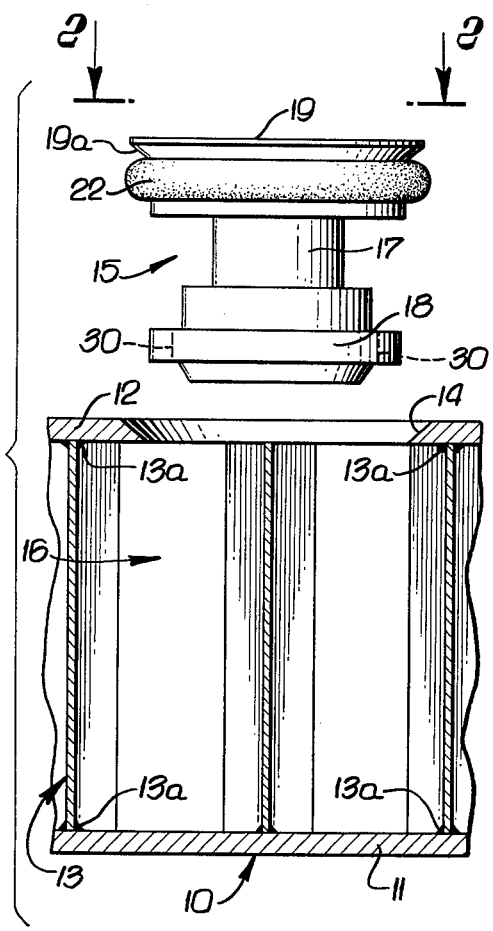
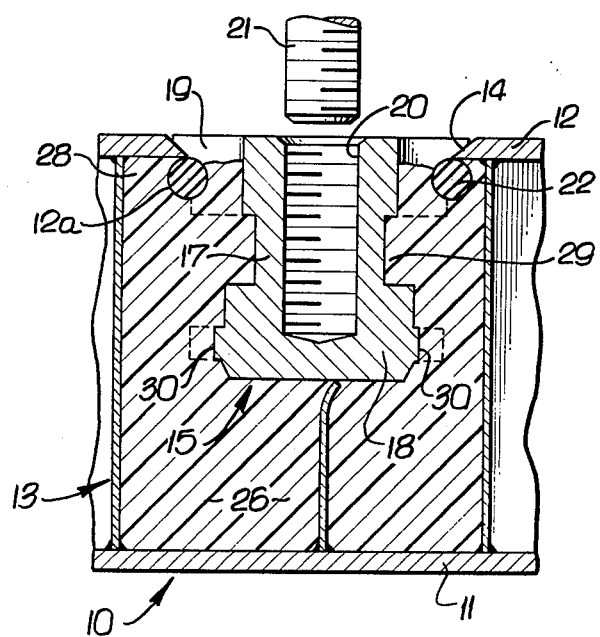

SANDWICH PANEL INSERT

This is a continuation, of application Ser. No. 321,245, filed Jan. 5, 1973 now abandoned.

BACKGROUND OF THE INVENTION

This invention relates generally to the connection of threaded fasteners to sandwich panel assemblies, and more particularly concerns the anchoring or retention of internally threaded inserts in such assemblies so as to receive such fasteners.

Sandwich panel assemblies typically comprise thin panels, such as metal skins, which are spaced apart and interconnected by cellular core structure, i.e. so-called "honeycomb". Such panel assemblies are lightweight and strong, and have great utility in aircraft structures such as fuselage and wing elements. However, the satisfactory attachment of fasteners to such panel assemblies has presented continuing problems. One method of attachment has embodied the filling (as by flowing) of a liquid substance such as resin into the assembly around the inserted insert followed by curing of that substance or material. However, the insert may easily become dislodged from position during such filling unless satisfactorily retained in position. Prior apparatus and methods for such temporary retention have lacked the unusual advantages flowing from or associated with the present invention, as will be explained.

Basically, the invention comprises an insert receivable into a sandwich panel assembly via a through opening in one panel, the insert comprising:

a. a shank and a pair of spaced heads integral therewith, one head being generally circularly sized for close reception in the one panel opening when the other head and shank are inserted into the space between the panels, b. the one head being apertured to pass hardenable material into the panel sandwich assembly and into the space between the heads to permanently retain the insert to the panel assembly, and c. a radially inwardly yieldable retainer retained on the insert adjacent and at the side of the one head which faces the other head, the retainer located to be deflected radially inwardly when inserted through the one panel via said opening and to expand radially outwardly immediately adjacent the inner side of said one panel to temporarily retain the insert against dislodgement from the panel assembly prior to hardening of the material in said assembly.

As will be seen, the retainer means may with unusual advantage comprise an elastomer O-ring seated in an annular groove defined by the head that closes the opening and protruding so that the ring extends radially outwardly and directly below the tapered underside of a flange on the head. Accordingly, the insert may be easily pushed into retention position and firmly retained during the described filling and curing of hardenable material that achieves the permanent retention.

These and other objects and advantages of the invention, as well as the details of an illustrative embodiment, will be more fully understood from the following description and drawings, in which:

DRAWING DESCRIPTION

FIG. 1 is an elevation showing the insert prior to assembly to the panel sandwhich;

FIG. 2 is a plan view taken on lines 2—2 of FIG. 1;

FIG. 3 is an elevation taken in section to show the in-place insert within the sandwich panel assembly;

FIG. 4 is a horizontal section taken on lines 4—4 of FIG. 3; and

FIG. 5 is a view like FIG. 3 showing the insert retained in position by hardened fill material.

DETAILED DESCRIPTION

In the drawings, a sandwich panel assembly 10 includes a pair of spaced, parallel panels 11 and 12 interconnected by cellular or honeycomb structure 13. For example, the panels and honeycomb may consist of metal and may be interconnected at the edges 13a of the cellular structure, as by bonding or brazing.

One panel, as for example panel 12, contains a through opening 14 which may be suitably formed as by drilling and countersinking. FIG. 1 shows an insert 15 positioned for downward reception into a cavity 16 formed in the cellular structure below the opening 14. If desired, the downward force of insertion of the insert may be employed to bottom the insert on structure 13. FIG. 3 shows a deformed edge 13b of a web 13c of the honeycomb.

The metallic insert comprises a shank 17 and a pair of axially spaced heads 18 and 19 integral with the shank. The latter may contain an axially threaded bore 20 to which a threaded fastener 21 may have access via the one head 19.

Head 19 is generally circularly sized for close reception in the opening 14 when the head 18 and shank 17 are inserted into the space or cavity 16 between the panels. Thus, head 19 may be tapered at its flange underside 19a to seat on the countersunk shoulder 14 forming the opening, whereby the top of head 19 may be made flush with the outer surface of panel 12 as appear in FIGS. 3 and 5.

In accordance with an important aspect of the invention, a radially inwardly yieldable retainer is retained on the insert adjacent and at the side of the head 19 which faces head 18. The retainer, which may with unusual advantage comprise an elastomeric O-ring 22 slightly oversize in relation to opening 14, is located and sized to be deflected radially inwardly when inserted downwardly through the opening 14, and to expand back radially outwardly immediately adjacent the inner side of the panel 12 at lip edge 12a to temporarily retain the insert against dislodgement from the panel assembly prior to permanent retention of the insert in position. For this purpose, the O-ring may be stretch fitted onto the insert so that the ring inner boundary seats in an annular shallow groove 23 in head 19, the outer boundary of the ring then being exposed directly beneath the tapered flange underside 19a.

The head 19 is furthermore apertured as at 25 to pass hardenable material 26 into the panel sandwich assembly, i.e. into the space or cavity 16 and between the heads 18 and 19. Upon hardening, such material locks or permanently retains the insert to the panel assembly, as it fills into the region 28 directly under the panel 12 as well as into the region 29 directly between the heads or flanges. Note that the material 16, as for example epoxide or other resin, passes or flows past the inner side 22a of the ring 22, as seen in FIG. 2, during filling of the cavity. As is clear from FIGS. 2 and 3, each aperture 25 is spaced radially outwardly from the bore 20 and from the insert axis, it is intersected by the groove 23, and it communicates the exterior with the space between heads 18 and 19. Also, the O-ring 22 extends at the outer boundary of each aperture 25.

Finally, it will be noted that the lower flange 18 may have an irregular periphery as for example is formed by scallops or cuts 30 and 31, so that hardenable material will fill same and block rotation of the insert in retained position.

I claim:

1. For combination with a panel sandwich assembly that includes a pair of spaced parallel panels interconnected by cellular structure, one of the panels containing a through opening, an insert partially receivable into said panel sandwich assembly through said through opening for retention, said insert comprising a. a shank and a pair of spaced heads integral therewith, the shank having an axis, one head being generally circular and of greater diameter than the one panel opening and the other head and shank being of lesser diameter opening whereby they may be inserted into the space between the panels, b. the one head defining an aperture to pass hardenable material into the panel sandwich assembly and into the space between the heads to permanently retain the insert to the panel assembly, the insert containing an axially threaded bore to which a threaded fastener may have access via said one head, and c. a radially inwardly yieldably retainer retained on the insert adjacent and at the side of the one head which faces the other head, the retainer located to be deflected radially inwardly when inserted through the one panel via said opening and to expand radially outwardly immediately adjacent the inner side of said one panel to cooperate with the said one head to temporarily retain the insert against dislodgement from the panel assembly prior to hardening of the material in said assembly, said retainer consisting of a elastomeric O-ring extending at the outer boundary of said aperture, and the aperture communicating the exterior with the space between the heads via the radially inner side of said O-ring, said aperture being locally confined at one side of the shank axis and spaced radially outwardly from said axis and bore, the aperture overlying the O-ring and also extending axially completely through the head more closely to the axis than the O-ring, the head also defining an annular groove seating the radially innermost side of the O-ring, said groove intersecting said aperture.

2. The insert of claim 1 wherein the outer side of the ring projects radially outwardly and directly below the tapered underside of a flange on the head.

3. The insert of claim 1 wherein said one head tapers toward said ring for engagement with a countersunk surface of said one panel.

4. The insert of claim 3 including said panel sandwich assembly defining said countersunk surface extending about said one panel opening and engaged by said one head.

5. The insert of claim 4 wherein the outer surfaces of the one panel and one head are generally in the same plane.

6. The combination of claim 4 with hardenable material filled into said panel assembly and about the insert and in cured state.

* * * * *